US008756813B1

(12) United States Patent
Rutecki et al.

(10) Patent No.: US 8,756,813 B1
(45) Date of Patent: Jun. 24, 2014

(54) INJECTOR REMANUFACTURING

(75) Inventors: William Joseph Rutecki, Mazomanie, WI (US); Randall Clare Harkema, Caledonia, MI (US); Thomas Edwin Earhart, Middleville, MI (US); Todd Foote, Wayland, MI (US)

(73) Assignee: Diesel Forward, Inc., Windsor, WI (US)

( * ) Notice: Subject to any disclaimer, the term of this patent is extended or adjusted under 35 U.S.C. 154(b) by 12 days.

(21) Appl. No.: 13/367,475

(22) Filed: Feb. 7, 2012

Related U.S. Application Data

(60) Provisional application No. 61/440,552, filed on Feb. 8, 2011.

(51) Int. Cl.
*F02M 61/18* (2006.01)
*B23P 6/00* (2006.01)

(52) U.S. Cl.
USPC .............. 29/890.121; 239/533.2; 29/888.011; 29/402.09; 29/402.13

(58) Field of Classification Search
USPC .............. 29/402.03, 402.04, 402.06, 402.08, 29/402.09, 402.13, 888.011, 888.021, 29/890.121, 592.1; 174/88; 239/533.2
See application file for complete search history.

(56) References Cited

U.S. PATENT DOCUMENTS

| | | | | |
|---|---|---|---|---|
| 1,920,528 A | * | 8/1933 | Butler et al. | 445/2 |
| 4,134,630 A | * | 1/1979 | Hinson | 445/2 |
| 5,127,749 A | * | 7/1992 | Tiano et al. | 400/124.24 |
| 2008/0050988 A1 | * | 2/2008 | Burger | 439/814 |
| 2008/0120840 A1 | * | 5/2008 | Jenkel et al. | 29/888.4 |

OTHER PUBLICATIONS

Media College, "Misc : Solder : Tinning", Jun. 3, 2004.*

* cited by examiner

*Primary Examiner* — Alexander P Taousakis
*Assistant Examiner* — Lee A Holly
(74) *Attorney, Agent, or Firm* — Craig A. Fieschko, Esq.; DeWitt Ross & Stevens S.C.

(57) ABSTRACT

A method of remanufacturing an injector involves an original lead extending from an overmold block. A milling cutter is used to mill a cavity into the overmold block to provide access to the original lead. The milling cutter splits the original lead into a remainder portion and a discard portion. A replacement lead is inserted into the overmold block to overlap with the remainder portion, and the overlapping leads are soldered to each other. The exposed overlap area is encapsulated with filling material. The original lead is preferably cut such that a tip of the remainder portion is angled, pointed, or otherwise shaped to increase the surface area that is exposed at the tip. The increased exposed surface area increases the area over which the replacement lead and the remainder portion make contact with each other when overlapping. Greater contact between the soldered leads strengthens their connection.

20 Claims, 4 Drawing Sheets

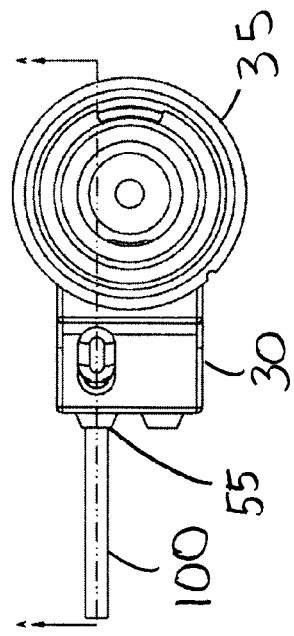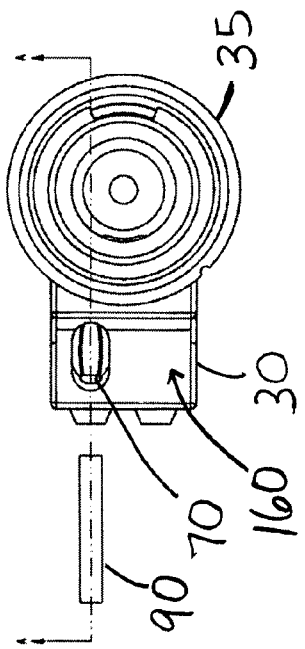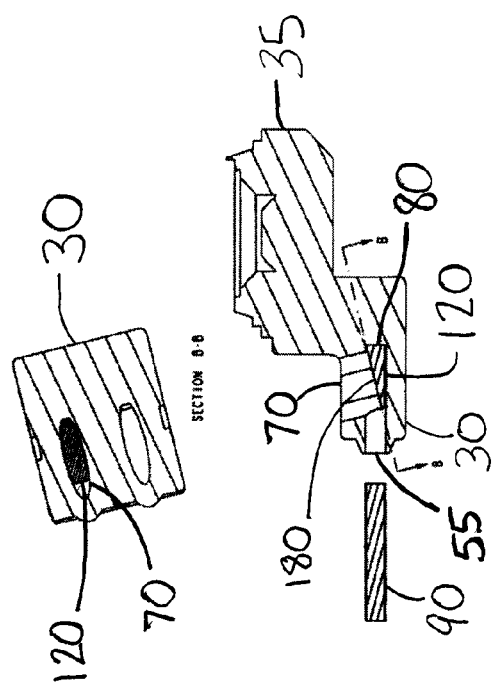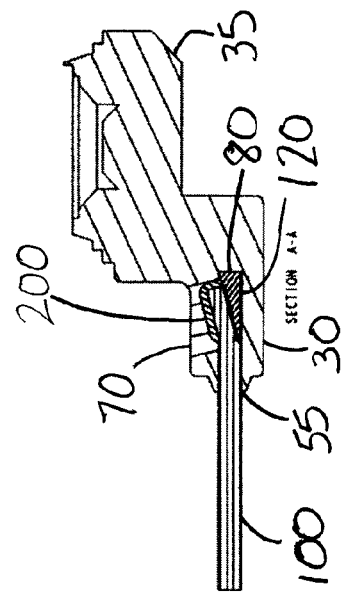
FIGURE 4A
FIGURE 4B
FIGURE 4C
FIGURE 4D

US 8,756,813 B1

INJECTOR REMANUFACTURING

CROSS-REFERENCE TO RELATED APPLICATIONS

This application claims priority under 35 USC §119(e) to U.S. Provisional Patent Application 61/440,552 filed Feb. 8, 2011, the entirety of which is incorporated by reference herein.

FIELD OF THE INVENTION

This document concerns an invention relating generally to remanufacturing fuel injectors used in engines.

BACKGROUND OF THE INVENTION

Engine fuel injectors are expensive because they must be manufactured to operate with high precision and without failure for extended periods of time, at extremely high pressures and vibrations, and across wide temperature ranges. Because of their expense, and for environmental reasons, it is often desirable to remanufacture a used fuel injector rather than to discard the injector and replace it with another one as the used injector approaches the end of its life cycle.

FIG. 1 shows a G2.8 diesel fuel injector 10, with electrical supply leads 20 (usually wires made of copper) extending into the top of the injector 10 to enter "overmold blocks" 30 (usually constructed of molded plastic). The overmold blocks 30 are shown as having a roughly L-shaped profile at the top right-hand and left-hand sides of the injector 10, and each is affixed to an associated stator 35. The electrical leads supply associated stator coils with electric pulses that electromagnetically drive the spool valve 45 from side to side, thereby actuating injection of fuel.

With many types of fuel injectors, a common problem over time is the failure of the electrical leads supplying the stators that actuate the injector's valve(s). Injectors frequently fail because one (or more) electrical lead breaks at the point where it enters the overmold block (or in close proximity to the overmold block), making it difficult to affix a replacement lead in a sturdy manner. In some cases, the lead fails within the overmold block. These failures tend to require that the affected overmold block and its associated stator be replaced on the injector. However, this is time-consuming, difficult, and expensive to accomplish because of the limited availability of stators, the need to replace the wiring within the connection plug, and similar factors.

What is needed is the ability to reliably replace damaged or defective electrical leads within overmold blocks of fuel injectors to extend the life cycle thereof without the need to replace the overmold block and stator of the fuel injector.

SUMMARY OF THE INVENTION

The invention, which is defined by the claims set forth at the end of this document, is directed to remanufactured injectors and methods of remanufacturing injectors which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring to FIGS. 1 and 2, an exemplary method of remanufacturing a fuel injector 10 used in an engine involves a fuel injector 10 with a damaged, compromised, or otherwise undesired lead 20 that is to be replaced (referred to as an "original" lead 20). (Here, it should be understood that "remanufacturing" can involve not merely repairing an item, but to repairing and reconditioning it so that it can be effectively equivalent to a newly-manufactured item, or nearly so.) The original lead 20 extends from an overmold block 30 (which is affixed to a stator 35), and includes an embedded portion 40 situated within the overmold block 30, and a protruding portion 50 that protrudes through a lead aperture 55 of the overmold block 30 and is situated outside of the overmold block 30. Referring to FIG. 3B, the method includes the step of using a milling cutter 60 to mill a cavity/pit 70 (see FIG. 4B) into the overmold block 30, providing access to the embedded portion 40 of the original lead 20. As shown in FIG. 3D, the milling cutter 60 cuts into the original lead 20 to substantially split the original lead 20 into a remainder portion 80 that remains within the overmold block 30, and a discard portion 90 that is to be removed from the overmold block 30. Referring to FIG. 4D, a replacement lead 100 is inserted through the lead aperture 55 and toward the remainder portion 80 of the original lead 20 so as to overlap with the remainder portion 80. The overlapping original and replacement leads 20, 100 are secured to each other, and the exposed overlap area covered with filling material 110, as shown in FIG. 5B.

The original lead 20 is preferably cut such that a tip 120 of the remainder portion 80 is angled, pointed, or otherwise shaped to increase the surface area that is exposed at the tip 120 (see FIG. 4B). The increased exposed surface area increases the area over which the replacement lead 100 and the original lead 20 remainder portion 80 can make contact with each other when overlapping, as shown in FIG. 4D. The milling cutter 60 can be used to cut a desired profile into the remainder portion 80. For example, as shown in FIG. 3B, the milling cutter 60 can cut into the original lead 20 at a non-perpendicular angle with respect to a long axis of the original lead 20. That is, the desired shape might be achievable by using the milling cutter 60 to cut into the overmold block 30 in a first direction 130 that makes an angle 140 of at least several degrees with respect to a normal 150 (i.e., a perpendicular line) of a surface 160 of the overmold block 30 that is to be milled (a "milling surface" 160). Greater contact provides a larger area over which the replacement lead 100 and the remainder portion 80 of the original lead 20 can be fused or cemented together (e.g., by being soldered to each other). This strengthens the connection of the replacement lead 100 so that it can better withstand the high temperatures, pressures, and vibrations (which can be as high as 30-40 Gigahertz) experienced by the injector 10 in an engine. A strengthened connection provides for a more robust repair so that the remanufactured injector 10 would be less prone to failure.

A fuel injector 10 remanufactured as discussed above includes an overmold block 30 having a cavity 70 milled therein, the cavity 70 being at least substantially filled-in with filling material 110, as shown in FIG. 5B. A remainder portion 80 of an original lead 20 (that had been cut using a cutting tool 60) is situated within the overmold block 30, the remainder portion 80 having a remainder tip 120 that is angled. A replacement lead 100 extends out from the overmold block 30 (the replacement lead 100 having been separate and distinct from the original lead 20). The replacement lead 100 overlaps the angled tip 120 of the remainder portion 80 of the original lead 20 at an area of overlap within the overmold block 30.

The remainder portion 80 and the replacement lead 100 are soldered together at the area of overlap, which is substantially encapsulated by the filling material 110.

Further advantages and features of the invention will be apparent from the remainder of this document in conjunction with the associated drawings.

BRIEF DESCRIPTION OF THE DRAWINGS

FIG. 4A is a top view of the overmold block 30 of FIG. 3D showing a cavity 70 cut into the overmold block 30 through the milling surface 160 and the discard portion 90 of the original lead 20 removed from the overmold block 30. The top portion of FIG. 4B shows a top view of the overmold block 30 of FIG. 4A through a cross section B-B, showing a relatively larger surface area formed at the tip 120 of the remainder portion 80 exposed for soldering. FIG. 4C is a top view of the overmold block 30 of FIG. 4B showing a replacement lead 100 inserted through a lead aperture 55. (It is noted that the replacement lead 100 would be referred to as the original lead 20 if the replacement lead 100 were to be subsequently replaced.) FIG. 4D is a side view of the overmold block 30 through cross-section A-A of FIG. 4C showing the replacement lead 100 overlapping the tip 120 of the remainder portion 80 of the original lead 20, with the replacement lead 100 soldered 200 to the remainder portion 80.

It is noted that the components shown in the figures are not necessarily to scale.

DETAILED DESCRIPTION OF PREFERRED VERSIONS OF THE INVENTION

Figure 1:
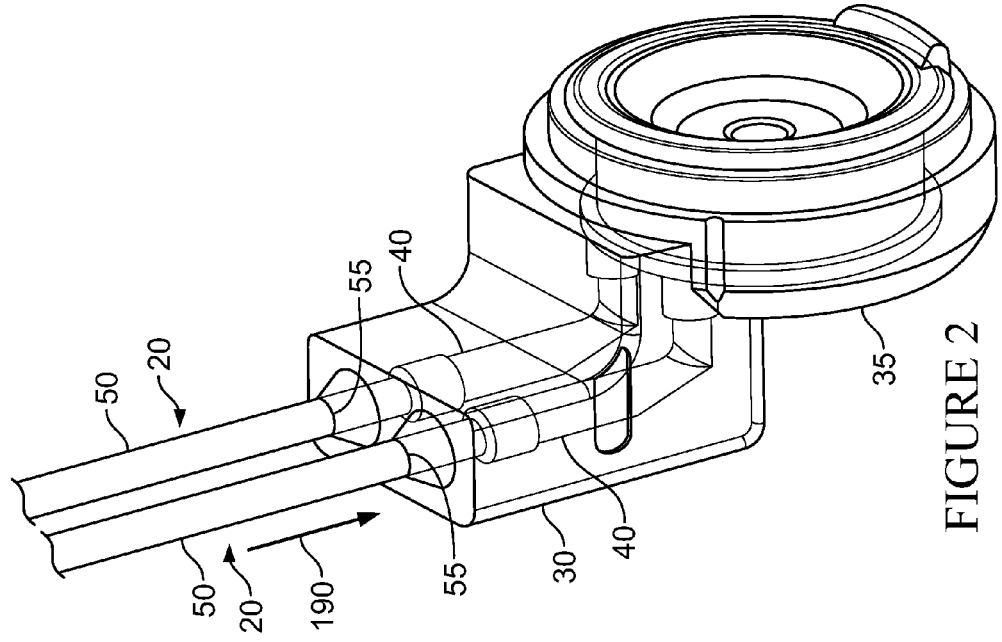
FIG. 1 is a side-view of an exemplary engine fuel injector 10 (specifically, the G2.8) in cross-section showing electrical leads 20 entering two overmold blocks 30. Although only one electrical lead 20 is viewable for each of the overmold blocks 30, this fuel injector 10 usually includes two leads 20 entering each overmold block 30 (see FIG. 2).

Initially, it is noted that in FIGS. 3A to 5B, the overmold block 30 and stator 35 are shown without the remaining components of the injector 10 of FIG. 1. However, the preferred remanufacturing method does not require removal of the overmold block 30 from the injector 10 for one or more of the electrical leads 20 to be replaced.

Figure 3A:
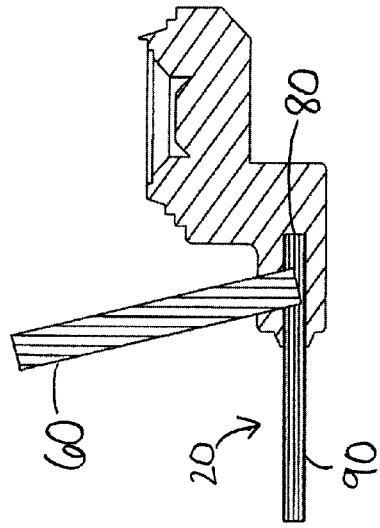
FIG. 3A is a top view of the overmold block 30 of FIG. 2, shown with only one electrical lead 20 exiting the overmold block 30. Because this electrical lead 20 is the lead currently in place and to be replaced, it is referred to as the original lead 20. The original lead 20 need not necessarily be the lead that was originally manufactured with this overmold block 30 as this electrical lead may have previously replaced another lead.
Figure 3C:
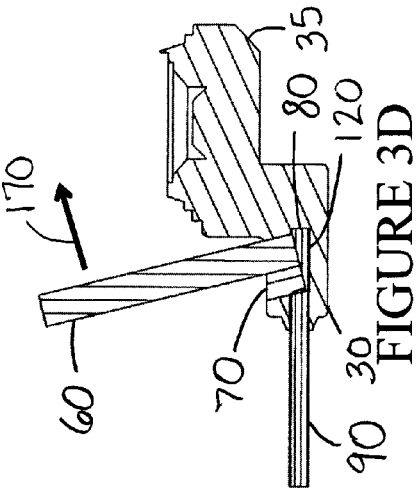
FIG. 3C shows the overmold block 30 of FIG. 3B being milled in the first direction 130 using the milling cutter 60, with the milling cutter 60 cutting into the original lead 20 to sever the original lead 20 into a remainder portion 80 and a discard portion 90.
Figure 3B:
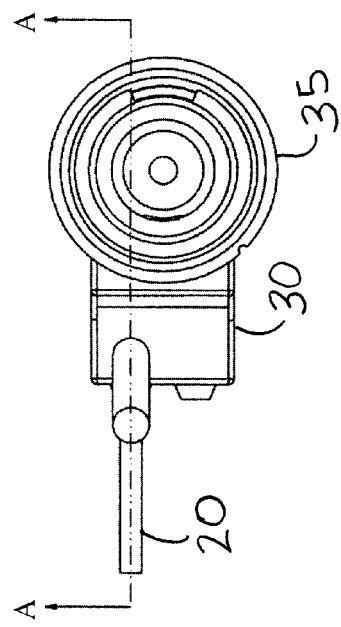
FIG. 3B is a side view of the overmold block 30 through cross-section A-A of FIG. 3A showing a milling cutter 60 approaching a milling surface 160 of the overmold block 30 in a first direction 130. It is noted that for simplicity the FIGS. 3A-5B do not show the entire length of the original lead 20 extending to the stator 35, but instead show the original lead 20 terminating within the overmold block 30.
Figure 3D:
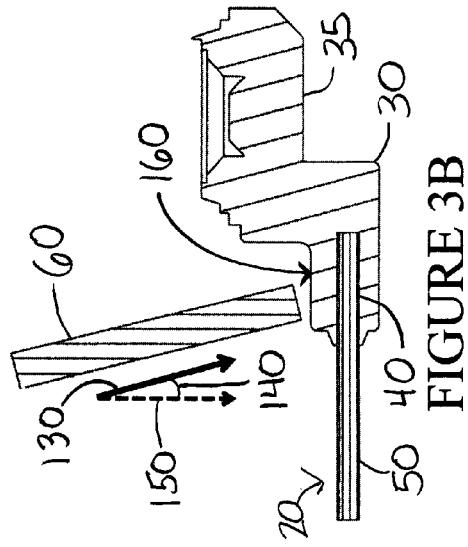
FIG. 3D shows the overmold block 30 of FIG. 3C being milled in a second direction 170, with the milling cutter 60 shaping a right triangle into the tip 120 of the remainder portion 80 of the original lead 20.
Figure 5A:
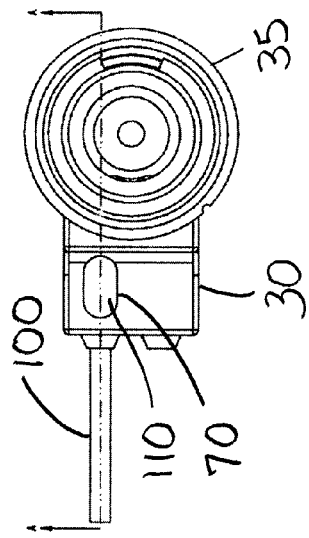
FIG. 5A is a top view of the overmold block 30 of FIG. 4C with a filling material 110 added to the cavity 70 formed by the milling cutter 60.
Figure 5B:
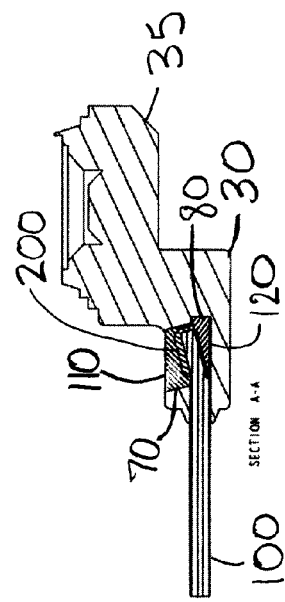
FIG. 5B is a side away through cross-section A-A of FIG. 5A showing the filling material 110 covering the soldered 200 replacement lead 100 and filling the cavity 70 formed by the milling cutter 60.

In FIG. 3B, the milling cutter 60 (which can be an end mill, drill, or other tool) approaches the milling surface 160 of the overmold block 30 at an angle that is appropriate for the injector 10 being remanufactured. For the G2.8, the direction of approach 130 (represented by the solid arrow) preferably makes an approximately 14-degree angle 140 with respect to the normal 150 (represented by the dotted arrow) of the milling surface 160. As shown in FIGS. 3C and 3D, the milling cutter 60 preferably cuts into the overmold block 30 to a depth sufficient to substantially sever the original lead 20 so that the discard portion 90 can be pulled out from the overmold block 30 without exerting considerable force. For the G2.8, a depth of approximately four millimeters would be expected to at least substantially sever the original lead 20 into the remainder portion 80 and the discard portion 90.

If the milling cutter 60 were pulled out of the overmold block 30 after it has severed the original lead 20 (i.e., just after the step represented by FIG. 3C), the remainder portion 80 would tend to have a relatively pointed tip 120, with the remainder portion 80 having a width that drops off relatively more gradually than a more "blunt" remainder tip 120. To provide the remainder portion 80 with an even more gradual or continuous drop-off in width at the remainder tip 120 (and thus a greater surface area than a more "blunt" remainder tip 120 having a more abrupt drop-off in width), the milling cutter 60 may cut into the overmold block 30 in the second direction 170 (represented by the solid arrow) indicated in FIG. 3D to give the remainder tip 120 a desired profile. As shown in FIG. 4B, the remainder tip 120 is approximately shaped as a right triangle, with the drop-off in length occurring as the hypotenuse 180 of the right triangle. Here, milling the overmold block 30 in the second direction 170 can in effect give shape to the hypotenuse 180 of the right triangle. Consequently, by shaping a more gradual drop-off in width, the remainder tip 120 is provided with an even greater surface area with which to overlap a replacement lead 100 and make contact therewith. Here, an additional length of about 2.5 millimeters of the remainder portion 80 (relative to a remainder portion 80 having an abrupt drop-off in width) is exposed for making contact with the replacement lead 100 so that the two can be more strongly secured to each other. Preferably, the replacement lead 100 and the remainder portion 80 are able to make contact with each other across a length that is at least two to three times the width of the original lead 20.

Figure 2:
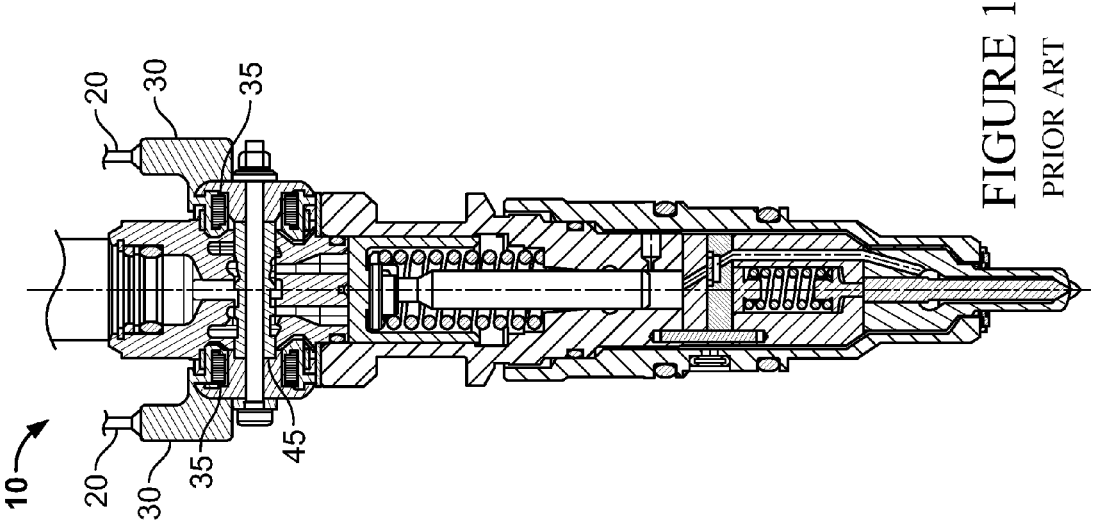
FIG. 2 is a perspective view of one of the overmold blocks 30 of FIG. 1, showing a pair of electrical leads 20 entering the overmold block 30.

Once the cavity 70 has been formed, the cavity 70 is preferably cleaned (such as with mineral spirits or other cleaning agents) to enhance the contact between the surfaces of the remainder portion 80 and the replacement lead 100. The replacement lead 100 is preferably tinned prior to being inserted into the overmold block 30 through the lead aperture 55 to help better secure the replacement lead 100 to the remainder portion 80. Optionally, the replacement lead 100 can be cut (e.g., to provide an angled tip) to provide for a more complementary fit between the replacement lead 100 and the remainder tip 120 and to further increase the area of contact between the replacement lead 100 and the remainder tip 120 (and thus further strengthen their connection to each other). Optionally, the lead aperture 55 can be milled/drilled (using a cutter, drill, or other tool 60) in a direction of lead insertion 190 (represented by the solid arrow in FIG. 2) to allow the replacement lead 100 to more easily pass through the overmold block 30. The lead aperture 55 can also be deburred to smoothen its surfaces prior to entry of the replacement lead 100 into the overmold block 30.

The tinned replacement lead 100 travels through the overmold block 30 at least until the replacement lead 100 overlaps the remainder tip 120, as shown in FIG. 4D. The overlapping leads are then soldered 200 using a soldering tool (not pictured) through the cavity 70 that was formed via the milling steps represented by FIGS. 3A-3D. Once the replacement lead 100 and the remainder tip 120 have been soldered together, the cavity 70 is preferably cleaned and/or defluxed or otherwise treated to lower the acidity of the flux paste or wax used in the soldering and/or tinning processes. This tends to increase the life of the connection between the replacement lead 100 the remainder portion 80 and thus the life of the remanufactured injector 10. Filling material 110 (such as epoxy, thermosetting resins, cyanoacrylates, etc.) can then be added to the cavity 70 to at least encapsulate or cover the soldered area of overlap between the replacement lead 100 and the remainder portion 80. The filling material 110 may also be laid over a "base layer" of a conductive cement or the like, which might be used to fill the bottom of the cavity 70 about the joinder of the remainder portion 80 of the original lead 20 to the replacement lead 100. Preferably, enough filling material 110 is added to at least substantially entirely fill in the cavity 70 formed by the milling process and seal in the replacement lead 100 (see FIG. 5B). The filling material 110 can subsequently be baked or otherwise solidified as appropriate.

Various preferred versions of the invention are shown and described above to illustrate different possible features of the invention and the varying ways in which these features may be combined. Apart from combining the different features of the foregoing versions in varying ways, other modifications are also considered to be within the scope of the invention. Following is an exemplary list of such modifications.

First, although FIG. 1 shows a particular diesel engine fuel injector 10, the above discussion is equally applicable to other fuel injectors 10 having overmold blocks 30, or to any other structures having one or more embedded leads or wires to be replaced with replacement leads or wires.

Second, passages/cavities/pits can be drilled or otherwise formed from different sides of the overmold block 30 than those shown in the figures, from different angles, and to different depths, as deemed appropriate for the particular device being remanufactured/reconditioned. For example, the overmold block can be milled from the parallel surface opposing the milling surface 160 on the opposing side of the overmold block 30.

Third, although an injector 10 is likely to be remanufactured if the original lead 20 is damaged or defective, an otherwise functional injector 10 can be remanufactured so as to replace its original lead 20 with a more durable replacement lead 100 (e.g., a replacement lead 100 with an insulating coating/sheath that is more durable and heat-resistant than conventional insulating coatings/sheaths).

Fourth, although in the above discussion one of two original leads 20 of a single overmold block 30 is replaced, when remanufacturing an injector 10 with a faulty lead, both leads 20 of an overmold block 30 (or all leads 20 of all overmold blocks 30) are often replaced as failure in one lead 20 may indicate that other leads 20 are soon to fail as well. However, if desired, only a single lead 20 can be replaced (with only a single cavity 70 being formed in the overmold block 30).

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A method of remanufacturing a fuel injector,
    a. the fuel injector having an original lead extending out of an overmold block, the original lead having:
        (1) an embedded portion positioned within the overmold block; and
        (2) a protruding portion positioned outside the overmold block;
    b. the method including the steps of:
        (1) milling a cavity into the overmold block using a milling cutter to cut into the overmold block in a first direction;
        (2) splitting the original lead into an original lead remainder portion and an original lead discard portion, wherein the original lead remainder portion:
            i. remains within the overmold block, and
            ii. includes a remainder tip that is angled such that a surface area of contact between the replacement lead and the remainder portion is increased;
        (3) removing the original lead discard portion from the overmold block; and
        (4) securing a replacement lead to the original lead remainder portion within the overmold block, wherein the securing step further includes the steps of
            i. inserting the replacement lead into the overmold block such that the replacement lead overlaps with at least a portion of the original lead remainder portion; and
            ii. soldering the replacement lead to the original lead remainder portion.

2. The method of claim 1 wherein the overmold block is milled such that the milling cutter cuts into the embedded portion of the original lead to at least substantially split the original lead into the original lead remainder portion and the original lead discard portion.

3. The method of claim 1 further including the step of tinning the remainder portion of the original lead prior to the securing step.

4. The method of claim 1 wherein:
    a. the original lead discard portion is removed from the overmold block through a lead aperture; and
    b. the method further includes the step of deburring the lead aperture after the original lead discard portion is removed from the overmold block.

5. The method of claim 1 further including the step of adding filling material to a milled portion of the overmold block.

6. The method of claim 1 further including the step of milling into the overmold block in a direction of lead insertion to facilitate entry of the replacement lead into the overmold block.

7. The method of claim 1 wherein a length of overlap between the replacement lead and the original lead remainder portion is between at least substantially two to at least substantially three times the width of the original lead.

8. The method of claim 1 further including the steps of:
    a. defluxing an area at which the replacement lead was soldered to the original lead remainder portion; and b. adding filling material to the overmold block to at least substantially fill the cavity.

9. The method of claim 1 wherein the method further includes the step of adding filling material to the overmold block so as to at least substantially cover the overlap between the original lead remainder portion and the replacement lead.

10. A method of remanufacturing a fuel injector,
a. the fuel injector having an original lead extending out of an overmold block, the original lead having:
(1) an embedded portion positioned within the overmold block, wherein the embedded portion includes a linear segment,
i. the linear segment extending along a lead axis,
ii. the lead axis being parallel with a long axis of the overmold block; and
(2) a protruding portion positioned outside the overmold block;
b. the method including the steps of:
(1) milling a cavity into the overmold block using a milling cutter to cut into the overmold block an angle of at least several degrees with respect to an axis that is perpendicular to the long axis of the overmold block;
(2) splitting the original lead into an original lead remainder portion and an original lead discard portion, the original lead remainder portion remaining within the overmold block;
(3) removing the original lead discard portion from the overmold block; and
(4) securing a replacement lead to the original lead remainder portion within the overmold block.

11. The method of claim 10 wherein the step of securing a replacement lead to the original lead remainder portion includes the steps of:
a. inserting the replacement lead into the overmold block such that the replacement lead overlaps with at least a portion of the original lead remainder portion; and
b. soldering the replacement lead to the original lead remainder portion.

12. A method of remanufacturing a fuel injector,
a. the fuel injector having an original lead extending out of an overmold block, the original lead having:
(1) an embedded portion positioned within the overmold block; and
(2) a protruding portion positioned outside the overmold block;
b. the method including the steps of:
(1) milling a cavity into the overmold block using a milling cutter to cut into the overmold block in a first direction;
(2) splitting the original lead into an original lead remainder portion terminating in a remainder tip and an original lead discard portion, the original lead remainder portion remaining within the overmold block;
(3) removing the original lead discard portion from the overmold block; and
(4) securing a replacement lead to the original lead remainder portion within the overmold block,
wherein the milling cutter, when cutting into the overmold block in the first direction to mill the cavity into the overmold block, cuts into the embedded portion of the original lead such that the remainder tip is angled.

13. The method of claim 12 further including the step of milling into the overmold block in a second direction so as to form a right triangle at the remainder tip, wherein the remainder tip is angled so as to form a hypotenuse of the right triangle.

14. The method of claim 12 wherein the step of securing a replacement lead to the original lead remainder portion includes the steps of:
a. inserting the replacement lead into the overmold block such that the replacement lead overlaps with at least a portion of the original lead remainder portion; and
b. soldering the replacement lead to the original lead remainder portion.

15. A method of remanufacturing a fuel injector,
a. the fuel injector having an original lead extending out of an overmold block, the original lead having:
i. an embedded portion positioned within the overmold block; and
ii. a protruding portion positioned outside the overmold block;
b. the method including the steps of:
i. milling a cavity into the overmold block using a milling cutter to mill into the overmold block, wherein the overmold block is milled in more than one direction;
ii. splitting the original lead into an original lead remainder portion and an original lead discard portion, the original lead remainder portion remaining within the overmold block;
iii. removing the original lead discard portion from the overmold block; and
iv. securing a replacement lead to the original lead remainder portion within the overmold block.

16. The method of claim 15 wherein the step of securing a replacement lead to the original lead remainder portion includes the steps of:
a. inserting the replacement lead into the overmold block such that the replacement lead overlaps with at least a portion of the original lead remainder portion; and
b. soldering the replacement lead to the original lead remainder portion.

17. A method of remanufacturing a fuel injector,
a. the fuel injector including an original lead extending from an overmold block, wherein:
i. the overmold block includes a milling surface, the milling surface having a milling surface normal that is perpendicular to a plane of the milling surface; and
ii. the original lead includes an embedded portion positioned within the overmold block, and a protruding portion that protrudes from the overmold block through a lead aperture;
b. the method including the steps of:
i. milling a cavity into the overmold block using a milling cutter, wherein:
1) the milling cutter cuts into the overmold block in a first direction that makes an angle of at least several degrees with the normal of the milling surface; and
2) the milling cutter at least substantially severs the embedded segment of the original lead into a discard portion and a remainder portion;
ii. removing the discard portion of the original lead from the overmold block;
iii. inserting a replacement lead into the overmold block through the lead aperture such that the replacement lead overlaps the remainder portion of the original lead; and
iv. securing the replacement lead to the remainder portion.

18. The method of claim 17 wherein the milling cutter cuts the original lead such that the remainder portion includes an angled tip to increase an exposed surface area over which the replacement lead contacts the remainder portion.

19. The method of claim 17:
  a. further including the step of tinning the replacement lead prior to the step of inserting the replacement lead into the overmold block,
  b. wherein the replacement lead is secured to the remainder portion of the original lead via soldering.

20. The method of claim 17 further including the step of milling into the overmold block in a second direction to form a right triangle at the remainder tip.

\* \* \* \* \*